United States Patent
Morishita (10) Patent No.: US 9,671,991 B2
(45) Date of Patent: Jun. 6, 2017

(54) PRINTING APPARATUS CONNECTABLE WITH WI-FI DIRECT, METHOD OF CONTROLLING THE SAME, AND STORAGE MEDIUM

(71) Applicant: CANON KABUSHIKI KAISHA, Tokyo (JP)

(72) Inventor: Yusuke Morishita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/066,172

(22) Filed: Mar. 10, 2016

(65) Prior Publication Data
US 2016/0269591 A1 Sep. 15, 2016

(30) Foreign Application Priority Data
Mar. 13, 2015 (JP) ................................ 2015-050799

(51) Int. Cl.
| | | |
|---|---|---|
| G06F 15/00 | (2006.01) | |
| G06F 3/12 | (2006.01) | |
| G06K 1/00 | (2006.01) | |
| H04N 1/00 | (2006.01) | |

(52) U.S. Cl.
CPC ............ *G06F 3/1292* (2013.01); *G06F 3/121* (2013.01); *G06F 3/1236* (2013.01); *H04N 1/00307* (2013.01); *H04N 1/00933* (2013.01); *H04N 2201/0094* (2013.01)

(58) Field of Classification Search
CPC ...... G06F 3/1292; G06F 3/121; G06F 3/1236; H04N 1/00307; H04N 1/00933; H04N 2201/0094
USPC ............................... 358/1.1, 1.15, 1.14, 1.13
See application file for complete search history.

(56) References Cited

U.S. PATENT DOCUMENTS

| | | | |
|---|---|---|---|
| 9,036,192 B2 | 5/2015 | Watanabe et al. | |
| 2015/0193183 A1* | 7/2015 | Ichikawa | ............... G06F 3/1292 358/1.15 |

FOREIGN PATENT DOCUMENTS

JP 2014107859 A 6/2014

\* cited by examiner

*Primary Examiner* — Douglas Tran
(74) *Attorney, Agent, or Firm* — Rossi, Kimms & McDowell LLP (57) ABSTRACT

A printing apparatus that makes it possible to prevent the operation of an application from being interrupted against the intention of a user during Wi-Fi direct connection, and thereby smoothly perform processing intended by the user. A printing apparatus equipped with a Wi-Fi direct function performs wireless connection to an external apparatus, by Wi-Fi direct connection. The printing apparatus determines based on information acquired from the external apparatus whether or not the user is operating a print application on the external apparatus, and if it is determined that the user is operating the print application on the external apparatus, the Wi-Fi direct connection between the printing apparatus and the external apparatus is extended.

4 Claims, 12 Drawing Sheets

PRINTING APPARATUS CONNECTABLE WITH WI-FI DIRECT, METHOD OF CONTROLLING THE SAME, AND STORAGE MEDIUM

BACKGROUND OF THE INVENTION

Field of the Invention

The present invention relates to a printing apparatus that is connectable with Wi-Fi direct, a method of controlling the same, and a storage medium.

Description of the Related Art

Conventionally, there has been proposed an information processing apparatus, such as an MFP (Multi-Function Printer), a PC, a smartphone, a tablet terminal, or the like, which has a Wi-Fi direct function (see e.g. Japanese Patent Laid-Open Publication No. 2014-107859). The Wi-Fi direct function is one of wireless LAN standards, for connecting between information processing apparatuses both equipped with the Wi-Fi direct function, with Wi-Fi direct without using a wireless LAN router. When the information processing apparatuses are connected to each other with Wi-Fi direct, an application is started in one of the information processing apparatuses, such as a smartphone, and the other of the information processing apparatuses, such as an MFP, performs various processing according to the operation of the started application.

Incidentally, the maximum number of information processing apparatuses simultaneously connected to the MFP with Wi-Fi direct (hereinafter referred to as the "maximum connection number") is determined in advance, and if the number of information processing apparatuses connected to the MFP with Wi-Fi direct connection has already reached the maximum connection number, a new information processing apparatus cannot be connected to the MFP with Wi-Fi direct. To prevent a new information processing apparatus from becoming incapable of being connected to the MFP with Wi-Fi direct, the Wi-Fi direct connection between the MFP and the information processing apparatus, such as a smartphone, is automatically disconnected according to a connection time period over which the smartphone has been connected to the MFP with Wi-Fi direct.

However, in a case where an application is started in the smartphone and the started application is operated, it takes a certain time period to complete the operation of the application, and hence the Wi-Fi direct connection between the MFP and the smartphone is sometimes disconnected during the operation of the application. When the Wi-Fi direct connection is disconnected, the operation of the application is interrupted. As a result, the user is required to start the operation of the application from the beginning again after resuming Wi-Fi direct connection, which causes a problem that processing intended by the user is not smoothly performed.

SUMMARY OF THE INVENTION

The present invention provides a printing apparatus that makes it possible to prevent the operation of an application from being interrupted against the intention of a user during Wi-Fi direct connection, and thereby smoothly perform processing intended by the user, a method of controlling the printing apparatus, and a storage medium.

In a first aspect of the present invention, there is provided a printing apparatus comprising a wireless communication unit configured to perform wireless connection to an external apparatus by direct wireless communication, a determination unit configured to determine, based on information acquired from the external apparatus, whether or not a user is operating a print application on the external apparatus, and a control unit configured to control the wireless communication unit not to disconnect the wireless connection by direct wireless communication in a case where it is determined by the determination unit that the user is operating the print application on the external apparatus.

In a second aspect of the present invention, there is provided a method of controlling a printing apparatus including a wireless communication unit configured to perform wireless connection to an external apparatus by direct wireless communication, comprising performing wireless connection to the external apparatus by direct wireless communication, determining, based on information acquired from the external apparatus, whether or not a user is operating a print application on the external apparatus, and controlling the wireless communication unit not to disconnect the wireless connection by direct wireless communication in a case where it is determined that the user is operating the print application on the external apparatus.

In a third aspect of the present invention, there is provided a non-transitory computer-readable storage medium storing a computer-executable program for executing a method of controlling a printing apparatus including a wireless communication unit configured to perform wireless connection to an external apparatus by direct wireless communication, wherein the method comprises performing wireless connection to the external apparatus by direct wireless communication, determining, based on information acquired from the external apparatus, whether or not a user is operating a print application on the external apparatus, and controlling the wireless communication unit not to disconnect the wireless connection by direct wireless communication in a case where it is determined that the user is operating the print application on the external apparatus.

According to the present invention, it is possible to prevent the operation of an application from being interrupted against the intention of a user during Wi-Fi direct connection, and thereby smoothly perform processing intended by the user.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
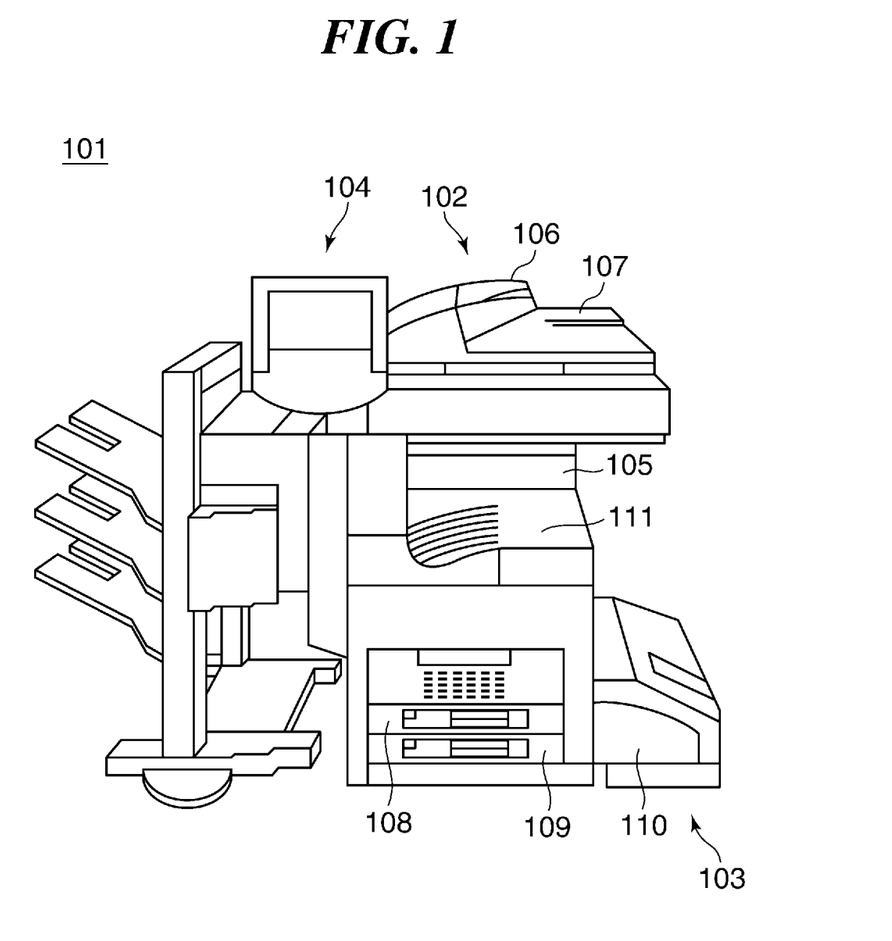
FIG. 1 is a front view of an MFP as a printing apparatus according to a first embodiment of the present invention.

FIG. 1 is a front view of an MFP 101 as a printing apparatus according to a first embodiment of the present invention.

The MFP 101 shown in FIG. 1 is comprised of a scanner 102, a printer 103, a console section 104, a controller 105, an original feeder 106, and a tray 107, and the printer 103 includes cassettes 108 to 110 and a discharge tray 111.

The scanner 102 reads an original and generates image data corresponding to the read original. When originals are set on the tray 107, and a user instructs reading of the originals set on the tray 107 via the console section 104, the original feeder 106 feeds the originals placed on the tray 107 one by one to the scanner 102, and the scanner 102 starts reading of the originals. The printer 103 prints e.g. image data generated by the scanner 102 on a recording sheet fed from the cassettes 108 to 110 storing recording sheets, and the recording sheet on which the image data has been printed is discharged onto the discharge tray 111. The controller 105 controls the operation of the MFP 101. Note that the MFP 101 is a component element that constitutes an information processing system together with a smartphone 300, referred to hereinafter, and the MFP 101 performs wireless communication with the smartphone 300.

Figure 2:
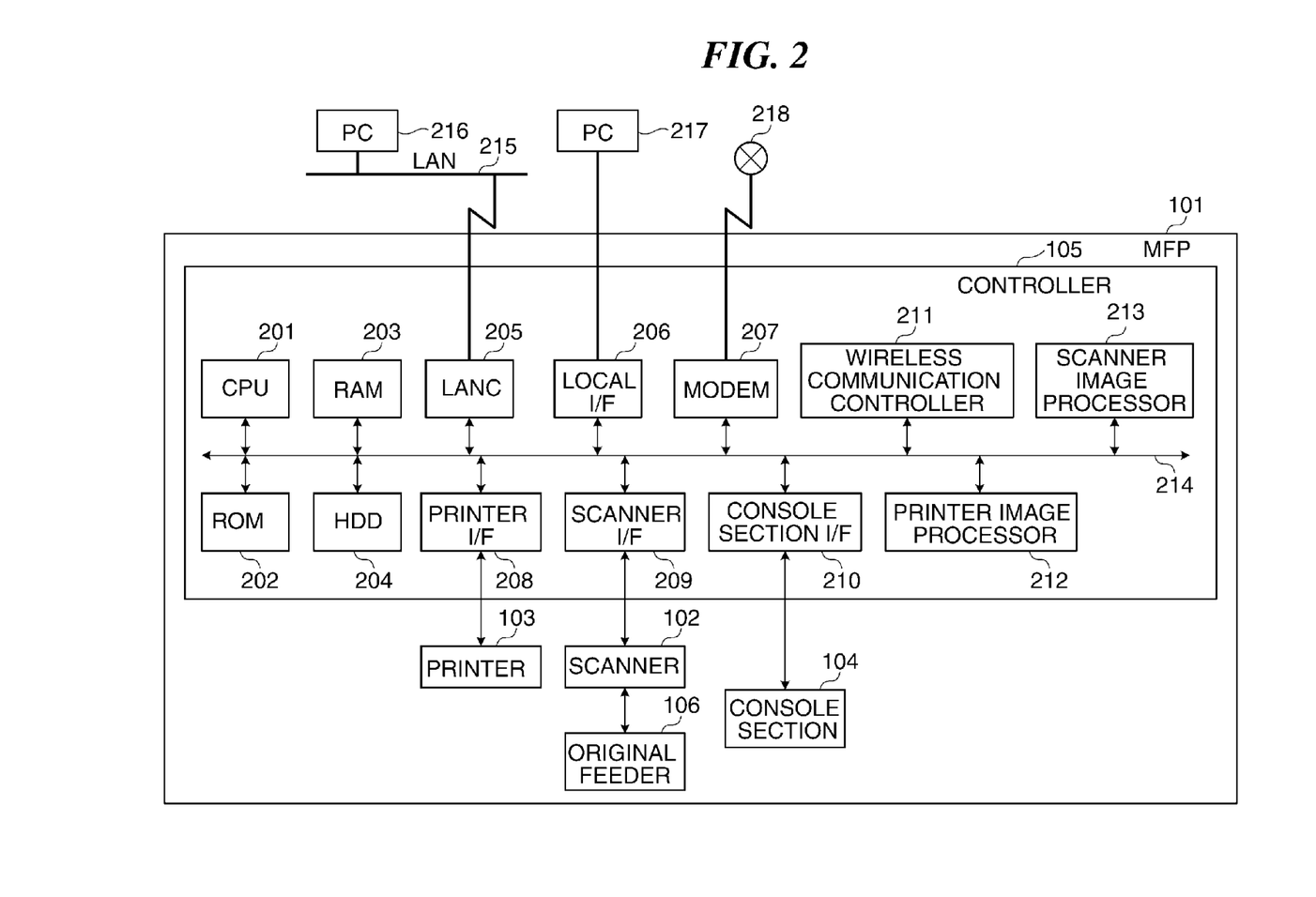
FIG. 2 is a schematic block diagram of the MFP shown in FIG. 1.

FIG. 2 is a schematic block diagram of the MFP 101 shown in FIG. 1.

The MFP 101 shown in FIG. 2 is comprised of the scanner 102, the printer 103, the console section 104, the controller 105, and the original feeder 106. Further, the controller 105 includes a CPU 201, a ROM 202, a RAM 203, an HDD 204, a LANC (LAN Controller) 205, a local interface 206, a modem 207, a printer interface 208, a scanner interface 209, a console section interface 210, a wireless communication controller 211, a printer image processor 212, and a scanner image processor 213, and these components are interconnected via a bus 214. A PC 216 is connected to the LANC 205 via a LAN 215, a PC 217 is connected to the local interface 206, the printer 103 is connected to the printer interface 208, the scanner 102 is connected to the scanner interface 209, the original feeder 106 is connected to the scanner 102, and the console section 104 is connected to the console section interface 210. Further, the modem 207 is connected to a public communication line 218.

The CPU 201 controls the controller 105 by causing programs stored in the ROM 202 to operate. The ROM 202 stores various programs which operate on the CPU 201, various data, and so forth. The RAM 203 is a work memory for the CPU 201. Further, control programs stored in the ROM 202 are loaded into the RAM 203, and the CPU 201 controls image signals and the components in a centralized manner by executing the control programs loaded into the RAM 203. The HDD 204 is a nonvolatile storage device for storing various programs, data, etc. The LANC 205 receives various data and information input from the PC 216, and outputs various data and information to the PC 216. The modem 207 receives information input from an external apparatus connected via the public communication line 218, and outputs information to the external apparatus. The wireless communication controller 211 controls wireless communication with an external apparatus, which is performed by any of communication methods including Wi-Fi, Wi-Fi direct, and Bluetooth (registered trademark).

Figure 3:
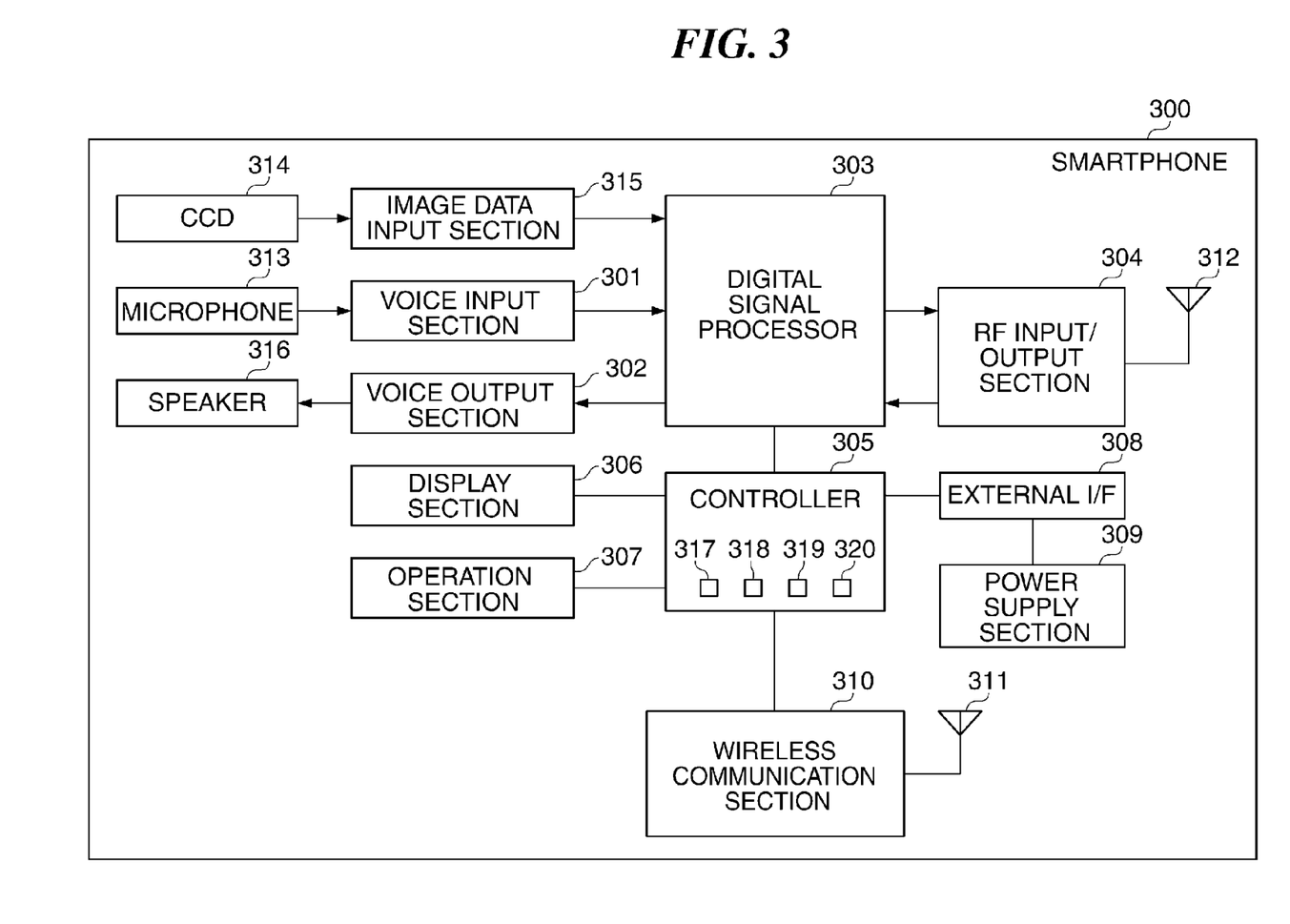
FIG. 3 is a schematic block diagram of a smartphone as an external apparatus that performs wireless communication with the MFP.
Figure 4A:
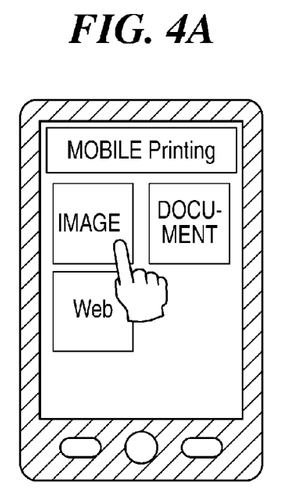
FIGS. 4A to 4F are diagrams useful in explaining a plurality of display screens displayed by turns on a display section appearing in FIG. 3 based on a user's operation when an application started on the smartphone shown in FIG. 3 is operated by the user.
Figure 4B:
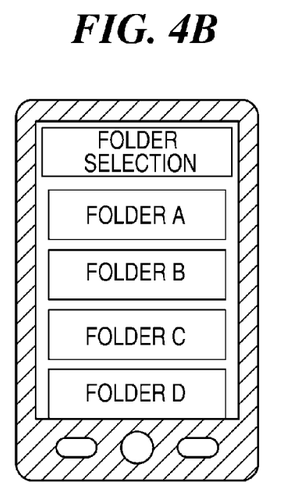
Figure 4C:
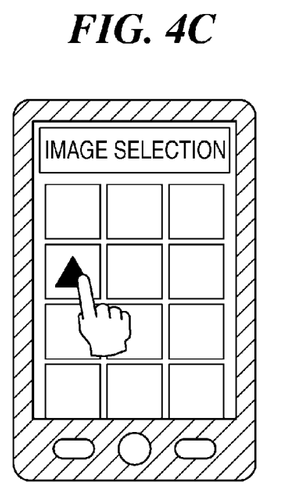
Figure 4D:
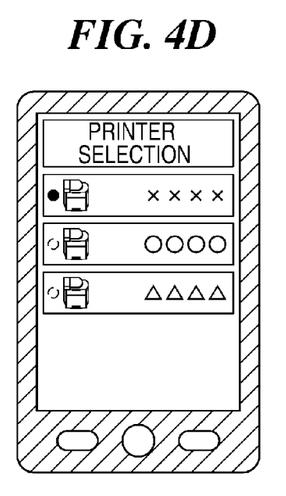
Figure 4E:
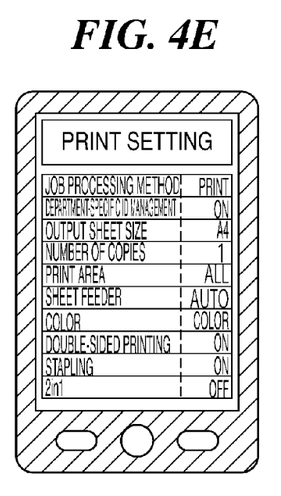
Figure 4F:
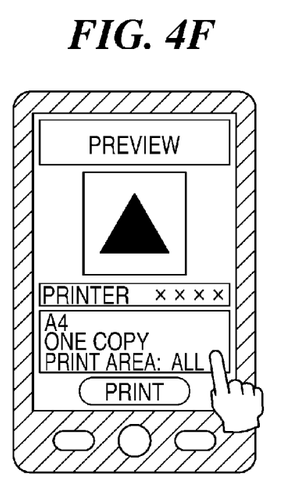

FIG. 3 is a schematic block diagram of the smartphone 300 as an external apparatus that performs wireless communication with the MFP 101 shown in FIG. 1.

The smartphone 300 shown in FIG. 3 is comprised of a voice input section 301, a voice output section 302, a digital signal processor 303, an RF input/output section 304, a controller 305, a display section 306, an operation section 307, an external interface 308, a power supply section 309, a wireless communication section 310, antennas 311 and 312, a microphone 313, a CCD sensor 314, an image data input section 315, and a speaker 316.

The digital signal processor 303, the display section 306, the operation section 307, the external interface 308, and the wireless communication section 310 are interconnected via the controller 305. Further, the voice input section 301, the voice output section 302, the RF input/output section 304, and the image data input section 315 are connected to the digital signal processor 303. Further, the microphone 313, the speaker 316, the antenna 312, and the CCD sensor 314 are connected to the voice input section 301, the voice output section 302, the RF input/output section 304, and the image data input section 315, respectively. The power supply section 309 is connected to the external interface 308, and the antenna 311 is connected to the wireless communication section 310.

The voice input section 301 inputs an analog voice signal received from the microphone 313 to the digital signal processor 303. The digital signal processor 303 coverts the input analog voice signal into a digital voice signal, and then outputs the digital voice signal to the voice output section 302. The voice output section 302 controls the speaker 316, and the speaker 316 outputs a voice corresponding to the digital voice signal input to the voice output section 302. The RF input/output section 304 performs a high-frequency transmission/reception process using the antenna 312, to thereby input various information from an external apparatus outside the smartphone 300, or output various information to the external apparatus outside the smartphone 300.

The controller 305 includes a flash ROM 317, a CPU 318, a SRAM 319, and an EEPROM 320, which are used when the smartphone 300 performs various functions. The flash ROM 317 stores various programs, such as programs for executing applications. The CPU 318 controls the components of the smartphone 300 by executing the programs stored in the flash ROM 317. The SRAM 319 is a nonvolatile storage medium which operates at a high speed, and stores various programs, data, etc. The EEPROM 320 stores setting information of the smartphone 300, such as an operation flag, referred to hereinafter.

The display section 306 displays information on the smartphone 300, etc. The operation section 307 is used when a user inputs various instructions to the smartphone 300. The power supply section 309 supplies electric power to the respective component elements of the smartphone 300. The wireless communication section 310 performs wireless communication with an external apparatus, such as the MFP 101, outside the smartphone 300, using a communication method, such as Wi-Fi, Wi-Fi direct, and Bluetooth (registered trademark), via the antenna 311 to thereby input or output various information from or to the MFP 101. The CCD sensor 314 converts information on a video and an image, such as an image photographed by a camera, not shown, to electric signals to thereby generate image data, and inputs the generated image data to the image data input section 315. The image data input section 315 outputs the image data input from the CCD sensor 314 to the digital signal processor 303.

FIGS. 4A to 4F are diagrams useful in explaining a plurality of display screens displayed on the display section 306 appearing in FIG. 3 by turns in accordance with respective user's operations when an application started on the smartphone 300 shown in FIG. 3 is operated by the user. The plurality of display screens shown in FIGS. 4A to 4F, respectively, are each displayed by turns on the display section 306, from when an application related to printing (hereinafter referred to as the "print application") is started in the smartphone 300 in a state in which the MFP 101 and the smartphone 300 are connected with Wi-Fi direct connection, to immediately before image data stored in the SRAM 319 is transmitted to the MFP 101.

When the print application is started in the smartphone 300, an initial screen (FIG. 4A) is displayed on the display section 306. The initial screen displays icons each corresponding to an attribute of an object to be printed, such as image data, document data, and Web data. In the illustrated example, an icon corresponding to image data is selected. When the icon corresponding to the image data is selected, a designation screen (FIG. 4B) showing a plurality of folders is displayed, and the user designates a folder storing the image data as the object to be printed (hereinafter referred to as the "print image data") out of the plurality of folders as candidates. When the folder storing the print image data is designated on the designation screen, a list screen (FIG. 4C) showing a list of the image data stored in the designated folder is displayed.

When the print image data is selected from the image data list displayed on the list screen, a printer selection screen (FIG. 4D) for selecting a printer for printing the image data is displayed. When a printer for printing the image data, e.g. the MFP 101 is selected, a setting screen (FIG. 4E) for setting print conditions for printing the image data, such as a sheet size, color/monochrome printing, and single-sided/double-sided printing, is displayed. Then, a preview screen (FIG. 4F) predicting a printing result is displayed, and when a print button on the preview screen is pressed, the image data is transmitted to the MFP 101 selected on the printer selection screen.

Figure 5:
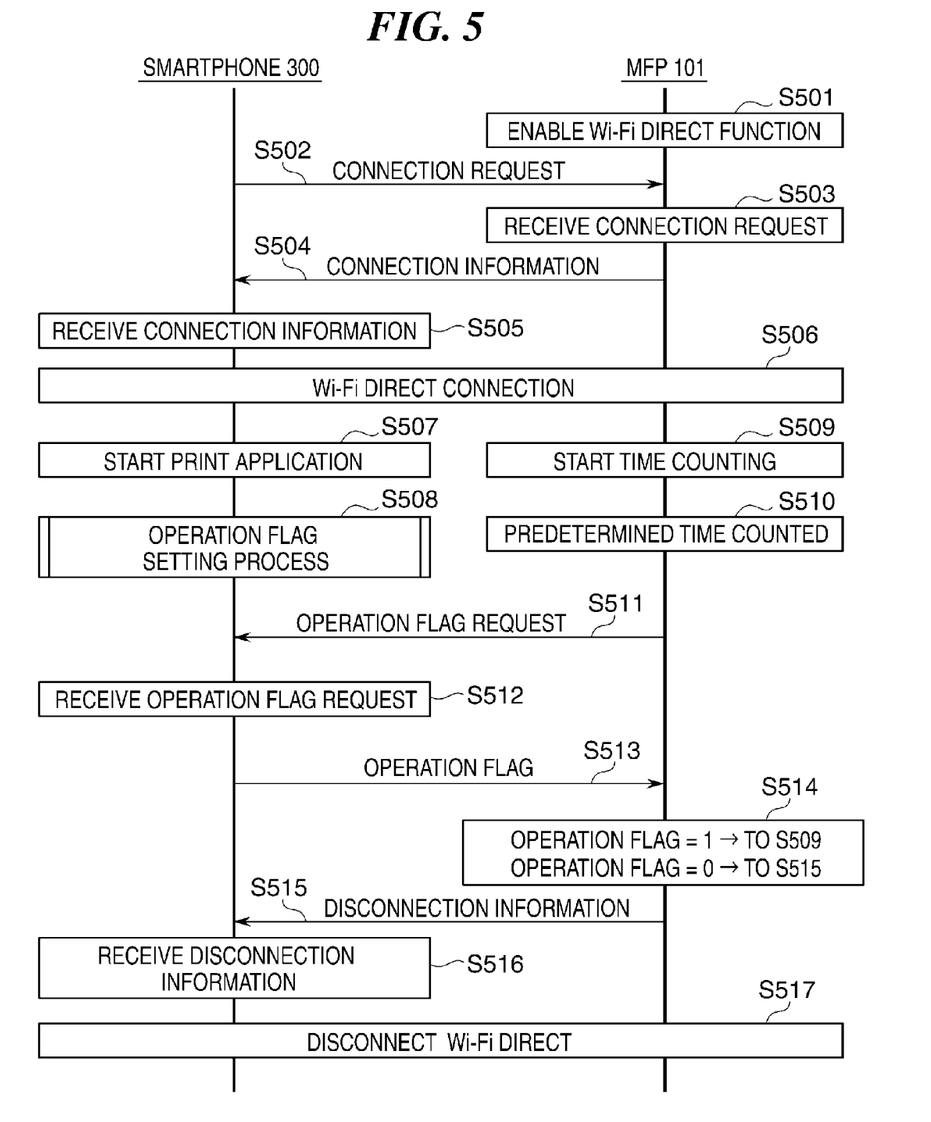
FIG. 5 is a sequence diagram of a Wi-Fi direct connection extension process, performed by the MFP shown in FIG. 1 and the smartphone shown in FIG. 3.

FIG. 5 is a sequence diagram of a Wi-Fi direct connection extension process which is performed by the MFP 101 shown in FIG. 1 and the smartphone 300 shown in FIG. 3.

Referring to FIG. 5, first, the MFP 101 enables the Wi-Fi direct function based on a user's instruction (step S501), the smartphone 300 transmits a connection request for connection with Wi-Fi direct to the MFP 101 based on a user's instruction (step S502), the MFP 101 receives the connection request from the smartphone 300 (step S503) and transmits connection information indicating that the device to be connected with Wi-Fi direct is the MFP 101 itself to the smartphone 300 (step S504), the smartphone 300 receives the connection information (step S505), and the MFP 101 and the smartphone 300 are connected with Wi-Fi direct (step S506).

Then, the smartphone 300 starts the print application based on a user's instruction (step S507), and performs an operation flag setting process, described hereinafter with reference to FIG. 6, to thereby set an operation flag indicative of whether or not the print application is operated by the user before a predetermined time period elapses after the MFP 101 and the smartphone 300 are connected with Wi-Fi direct (step S508). Note that the generated operation flag is set to either 0 or 1, and when the operation flag is 0, this indicates that the print application is not operated by the user before the predetermined time period elapses after the MFP 101 and the smartphone 300 are connected with Wi-Fi direct, and when the operation flag is 1, this indicates that the print application is operated by the user before the predetermined time period elapses after the MFP 101 and the smartphone 300 are connected with Wi-Fi direct.

On the other hand, upon connection to the smartphone 300 with Wi-Fi direct, the MFP 101 starts time counting using a timer (step S509), and when a predetermine time period set to the MFP 101 in advance elapses (step S510), the MFP 101 transmits an operation flag request for requesting transmission of the operation flag, to the smartphone 300 (step S511).

The smartphone 300 receives the operation flag request (step S512), and transmits the operation flag to the MFP 101 (step S513). The MFP 101 receives the operation flag, and in a case where the operation flag is 1, the MFP 101 extends Wi-Fi direct connection between the MFP 101 and the smartphone 300 by resetting the timer and restarting time counting, and returns to the step S509 (described as part of a step S514). On the other hand, in a case where the operation flag is 0, the MFP 101 proceeds to a step S515 (described as part of the step S514) to transmit disconnection information for disconnecting the Wi-Fi direct connection, to the smartphone 300 (step S515), and upon receipt of the disconnection information from the MFP 101 (step S516), the smartphone 300 disconnects the Wi-Fi direct connection between the MFP 101 and the smartphone 300 (step S517), followed by terminating the present process.

Figure 6:
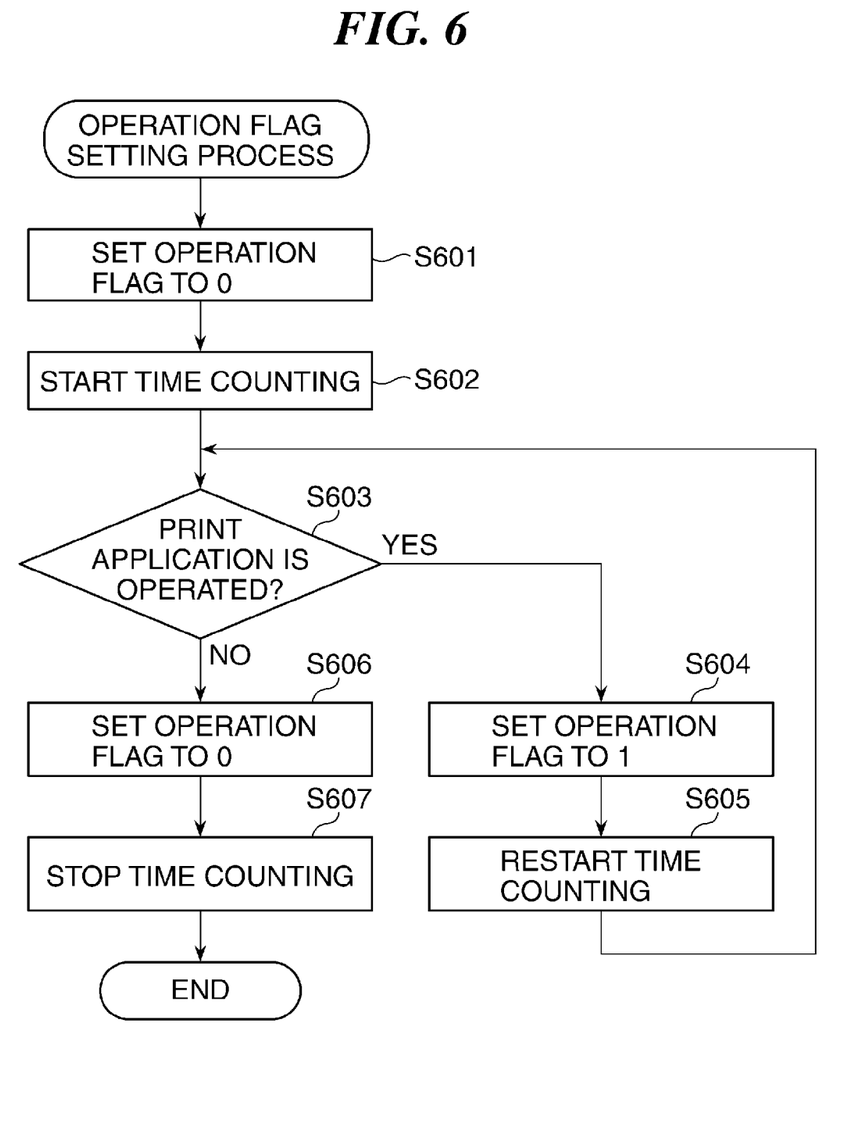
FIG. 6 is a flowchart of an operation flag setting process performed in a step in FIG. 5.

FIG. 6 is a flowchart of the operation flag setting process performed in the step S508 in FIG. 5. Further, FIG. 7 is a diagram useful in explaining a relationship between the operation of the timer used in the operation flag setting process in FIG. 6 and a value of the operation flag, which is set depending on whether or not the print application is operated.

Figure 7:
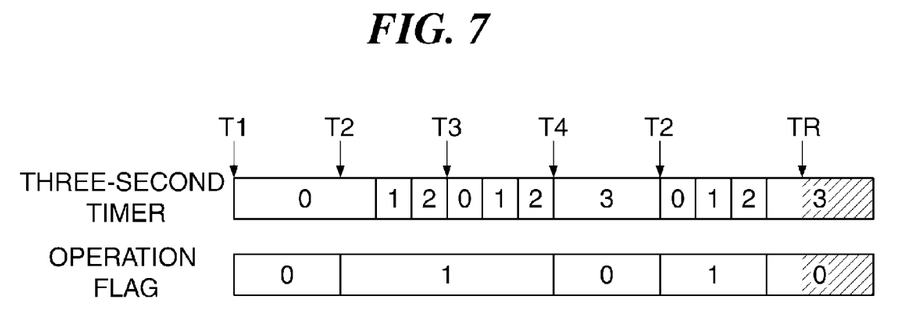
FIG. 7 is a diagram useful in explaining a relationship between the operation of a three-second timer used in the operation flag setting process in FIG. 6 and a value of an operation flag, which is set depending on whether or not a print application is operated.

Referring to FIGS. 6 and 7, first, the smartphone 300 on which the print application has been started sets the operation flag to 0 (step S601, T1), and causes an N-second timer to start time counting (step S602, T2). Note that in the present process, the description is given assuming that the N-second timer is a three-second timer which is capable of counting up to three seconds. Then, the smartphone 300 determines whether or not the smartphone 300 on which print application has been started is operated by the user before a three-second time period elapses after the three-second timer starts time counting (step S603).

If it is determined in the step S603 that the smartphone 300 on which the print application has been started is operated by the user before the three-second time period elapses after the three-second timer starts time counting, the smartphone 300 sets the operation flag to 1 (step S604, T3), resets the three-second timer to cause the three-second timer to start time counting again (step S605, T3), and returns to the step S603. If the smartphone 300 on which the print application has been started is not operated by the user before the three-second time period elapses after the three-second timer starts time counting, the smartphone 300 sets the operation flag to 0 (step S606, T4), and causes the three-second timer to stop time counting (step S607, T4), followed by terminating the present process. The operation flag set as described above is stored in the EEPROM 320, and when the smartphone 300 receives the operation flag request (step S512, TR), the smartphone 300 transmits the operation flag stored in the EEPROM 320 to the MFP 101.

According to the Wi-Fi direct connection extension process in FIG. 5, in a case where the operation flag is 1, i.e. in a case where the print application is operated by the user, before the predetermined time period elapses after the MFP 101 and the smartphone 300 are connected with Wi-Fi direct or after the Wi-Fi direct connection is extended, the Wi-Fi direct connection between the MFP 101 and the smartphone 300 is extended (step S514), whereas in a case where the operation flag is 0, i.e. in a case where the print application is not operated by the user, before the predetermined time period elapses after the MFP 101 and the smartphone 300 are connected with Wi-Fi direct or after the Wi-Fi direct connection is extended, the Wi-Fi direct connection between the MFP 101 and the smartphone 300 is disconnected (steps S514 and S517). Therefore, the Wi-Fi direct connection is not unconditionally disconnected at the timing of the lapse of a predetermined time period after the MFP 101 and the smartphone 300 are connected with Wi-Fi direct. With this, the Wi-Fi direct connection is prevented from being disconnected during the operation of the print application, and hence the print application is prevented from being interrupted, which enables the user to smoothly perform the operation of the print application, to thereby smoothly perform processing intended by the user.

According to the Wi-Fi direct connection extension process in FIG. 5 including the operation flag setting process in FIG. 6, by performing the operation flag setting process, the operation flag is set to a different value depending on whether or not the print application is operated by the user (step S508: S604 and S606), and the thus set operation flag is transmitted to the MFP 101 (step S513). That is, whether or not the print application is operated by the user is determined based on the operation flag, and hence it is possible to improve the reliability of determination by the MFP 101 as to whether or not to extend the Wi-Fi direct connection.

Further, according to the Wi-Fi direct connection extension process described with reference to FIGS. 5 to 7, the print application is started (step S507). In a case where the smartphone 300 on which the print application has been started is operated by the user before the three-second time period elapses after the three-second timer starts time counting (YES to the step S603), the operation flag is set to 1 (step S604), whereas in a case where the smartphone 300 on which the print application has been started is not operated by the user before the three-second time period elapses after the three-second timer starts time counting (NO to the step S603), the operation flag is set to 0 (step S606). The operation flag set as described above is stored in the EEPROM 320, and when the smartphone 300 receives the operation flag request (step S512), the operation flag stored in the EEPROM 320 is transmitted to the MFP 101, and hence the MFP 101 can properly determine whether to extend or disconnect the Wi-Fi direct connection based on whether or not the smartphone 300 on which the print application has been started is operated, i.e. whether or not the print application is operated.

Figure 8:
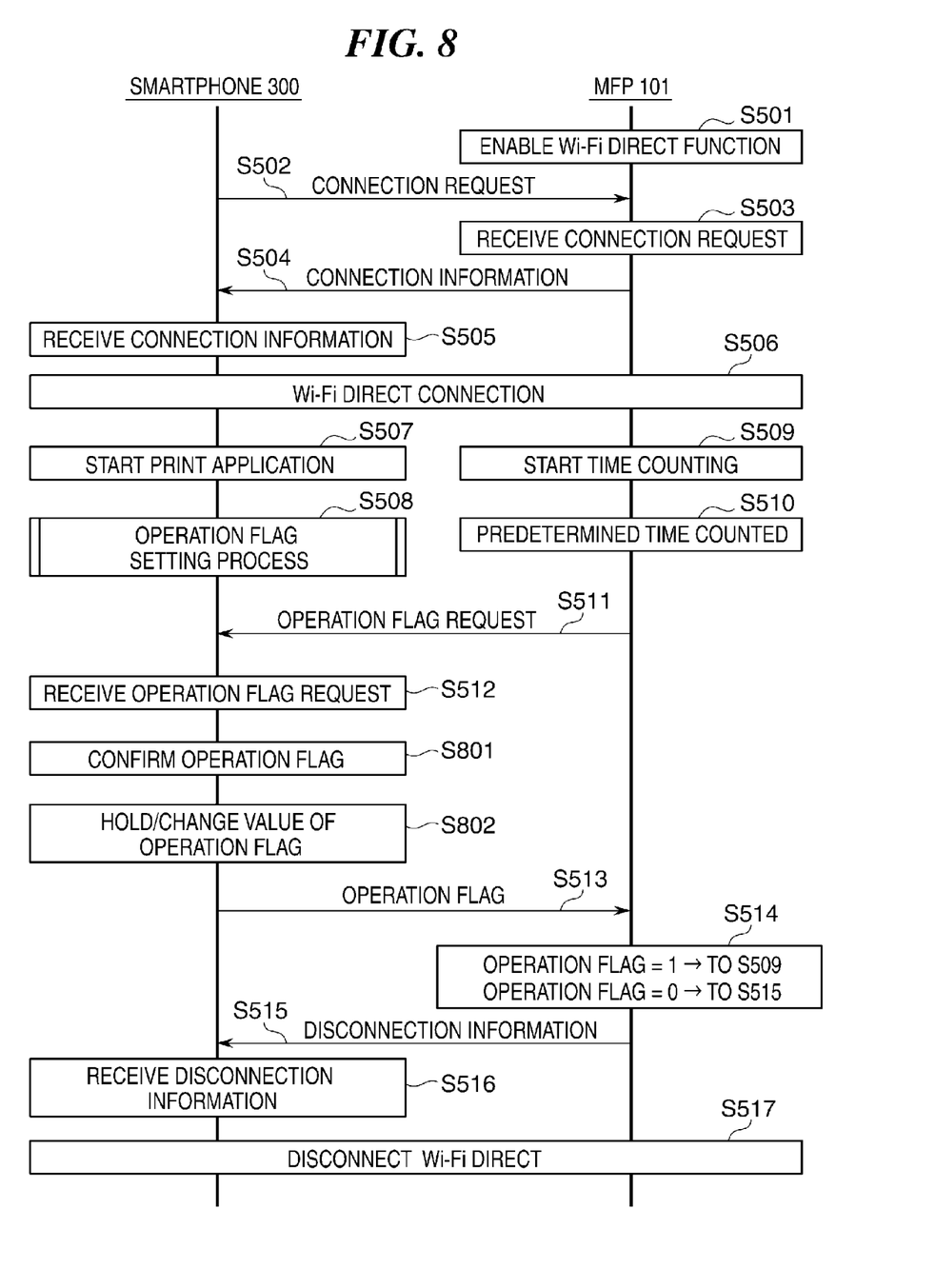
FIG. 8 is a sequence diagram of a variation of the Wi-Fi direct connection extension process in FIG. 5.

FIG. 8 is a sequence diagram of a variation of the Wi-Fi direct connection extension process in FIG. 5. Further, FIG. 10 is a diagram useful in explaining a relationship between the operation of the three-second timer used in an operation flag value-holding/changing process in a step S802 in FIG. 8 and a value of the operation flag.

The Wi-Fi direct connection extension process in FIG. 8 differs from the Wi-Fi direct connection extension process in FIG. 5 in that the operation flag is set to a different value not simply depending on whether or not the print application is operated by a user, but also according to which of an extension button 1101 and a disconnection button 1102, referred to hereinafter, is operated. Further, the steps S501 to S517 in FIG. 8 are the same as the steps S501 to S517 in FIG. 5, and T1, T2, and TR in FIG. 10 correspond to T1, T2, and TR in FIG. 7, respectively, for the same indications. Therefore, the following description will be given only of different points from the Wi-Fi direct connection extension process described with reference to FIGS. 5 to 7.

Figure 10:
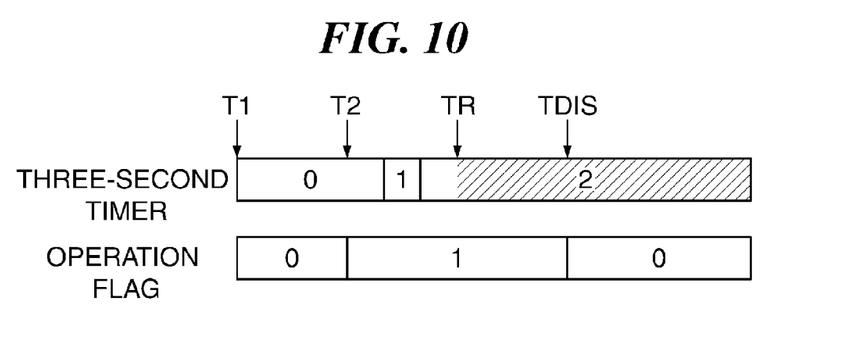
FIG. 10 is a diagram useful in explaining a relationship between the operation of the three-second timer used in an operation flag value-holding/changing process in a step in FIG. 8 and a value of the operation flag.

Referring to FIGS. 8 and 10, upon receipt of the operation flag request (step S512), the smartphone 300 refers to the EEPROM 320, confirms the operation flag to be transmitted to the MFP 101 (step S801), and displays an extension confirmation screen 1100 (see FIG. 11) on the display section 306.

Figure 11:
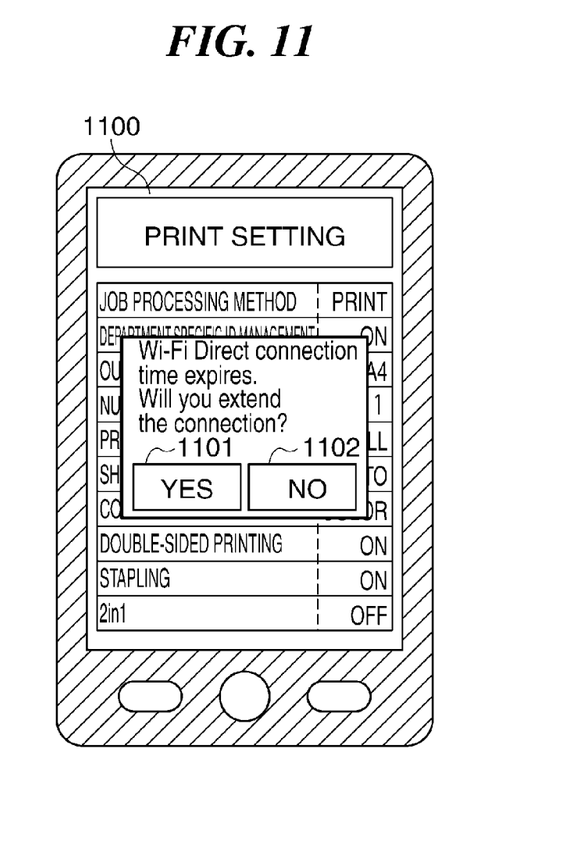
FIG. 11 is a view useful in explaining an extension confirmation screen displayed on the display section appearing in FIG. 3.

The extension confirmation screen 1100 includes the extension button 1101 and the disconnection button 1102, and in a case where the extension button 1101 is pressed (extension instruction), the smartphone 300 sets the value of the operation flag stored in the EEPROM 320 to 1. More specifically, if the value of the operation flag stored in the EEPROM 320 is 0, the value of the operation flag is changed to 1, whereas if the value of the operation flag stored in the EEPROM 320 is 1, the value of the operation flag is held at 1 (step S802). On the other hand, in a case where the disconnection button 1102 is pressed, the smartphone 300 sets the value of the operation flag stored in the EEPROM 320 to 0. More specifically, if the value of the operation flag stored in the EEPROM 320 is 1, the value of the operation flag is changed to 0 (TDIS in FIG. 10), whereas if the value of the operation flag stored in the EEPROM 320 is 0, the value of the operation flag is held at 0 (step S802).

After that, the smartphone 300 transmits the operation flag stored in the EEPROM 320 to the MFP 101 (step S513).

Figure 9:
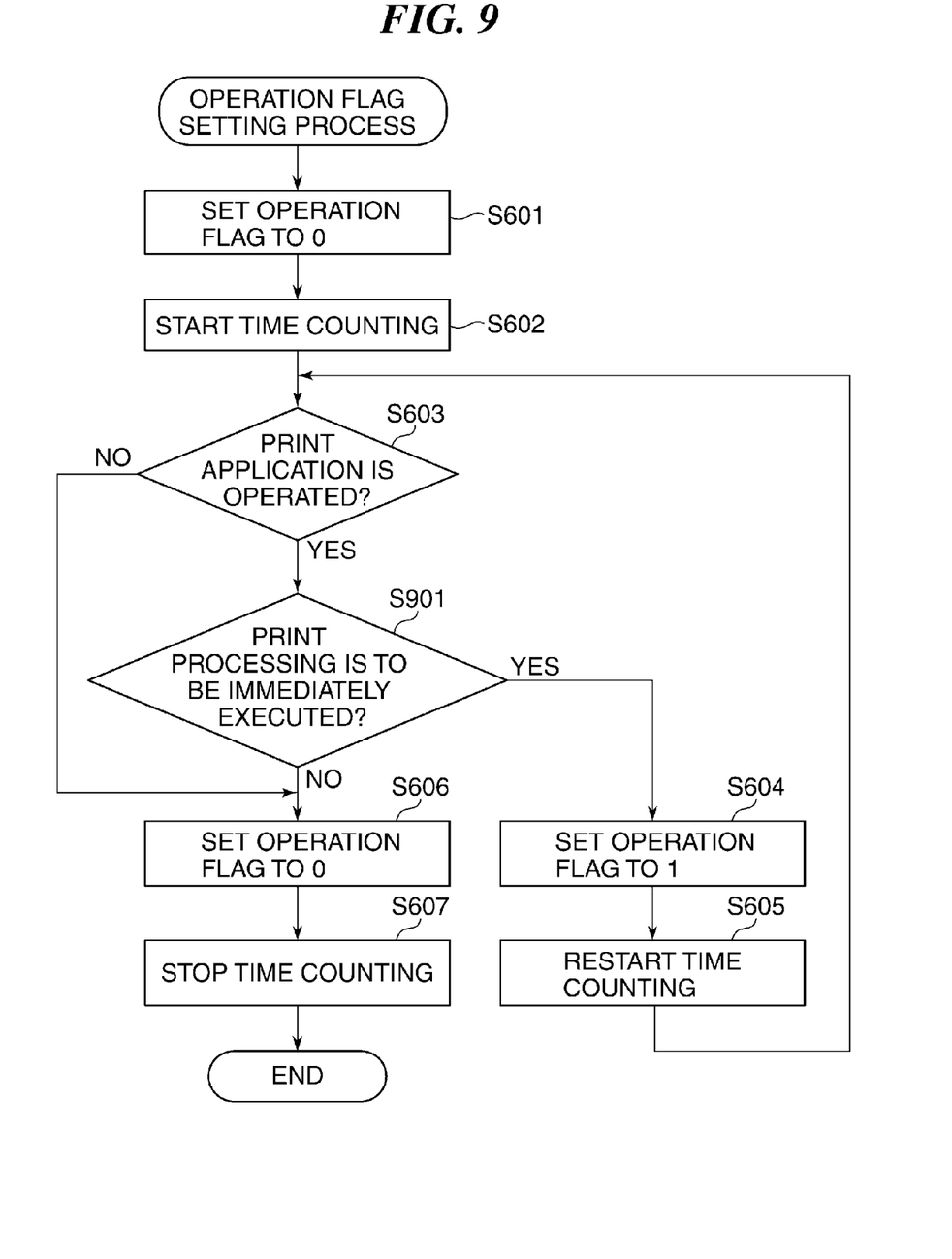
FIG. 9 is a flowchart of a variation of the operation flag setting process in FIG. 6.

FIG. 9 is a flowchart of a variation of the operation flag setting process in FIG. 6.

The operation flag setting process in FIG. 9 differs from the operation flag setting process in FIG. 6 in that the operation flag is set to a different value not simply depending on whether or not the print application is operated by a user, but also according to a type of the operation of the print application performed by the user. Further, the steps S601 to S607 in FIG. 9 are the same as the steps S601 to S607 in FIG. 6, and hence the following description will be given only of different points from the operation flag setting process in FIG. 6.

Referring to FIG. 9, when the smartphone 300 on which the print application has been started is operated by the user before the three-second time period elapses after the three-second timer starts time counting (YES to the step S603), the smartphone 300 determines whether or not the user's operation is an operation which leads to immediate execution of print processing (step S901).

Incidentally, examples of the above-mentioned "operation which leads to immediate execution of print processing" include an operation performed by the user for selecting a printing apparatus to be used for printing (i.e. an operation on the above-described printer selection screen (FIG. 4D)) and an operation for setting printing conditions for printing print image data on the printing apparatus (i.e. an operation on the above-described setting screen (FIG. 4E)). On the other hand, examples of an "operation which does not lead to immediate execution of print processing" include an operation for selecting print image data from a plurality of candidates (i.e. an operation on the above-described list screen (FIG. 4C)).

If it is determined in the step S901 that the user's operation is an operation which leads to immediate execution of print processing, the process proceeds to the step S604, wherein the operation flag is set to 1, whereas if the user's operation is not an operation which leads to immediate execution of print processing, the process proceeds to the step S606, wherein the operation flag is set to 0.

According to the operation flag setting process in FIG. 9, when print processing is to be immediately executed (YES to the step S901), the operation flag is set to 1 (step S604), whereas when print processing is not to be immediately executed (NO to the step S901), the operation flag is set to 0 (step S606). By executing this process, when an operation having a high possibility of immediately executing print processing is performed, the Wi-Fi direct connection is extended, whereas when an operation having a low possibility of immediately executing print processing is performed, the Wi-Fi direct connection is disconnected. This makes it possible to prevent Wi-Fi direct connection from being unnecessarily extended.

According to the Wi-Fi connection extension process in FIG. 8, when the extension button 1101 is pressed on the extension confirmation screen 1100, the value of the operation flag stored in the EEPROM 320 is set to 1. That is, when extension of Wi-Fi direct connection between the MFP 101 and the smartphone 300 is instructed by the user, the value of the operation flag is set to 1, and hence it is possible to extend the Wi-Fi direct connection between the MFP 101 and the smartphone 300 even when the print application is not operated, whereby it is possible to positively realize the intention of the user who desires to continue the operation of the print application on the smartphone 300.

Next, a description will be given of a second embodiment of the present invention.

The second embodiment of the present invention is basically the same in configuration and operation as the above-described first embodiment, and differs from the first embodiment of the present invention in that whether to extend or disconnect the Wi-Fi direct connection between the MFP 101 and the smartphone 300 is determined based on a distance between the MFP 101 and the smartphone 300. Therefore, description of the redundant description of the configuration and operation is omitted, and the following description will be given only of different points.

Figure 12:
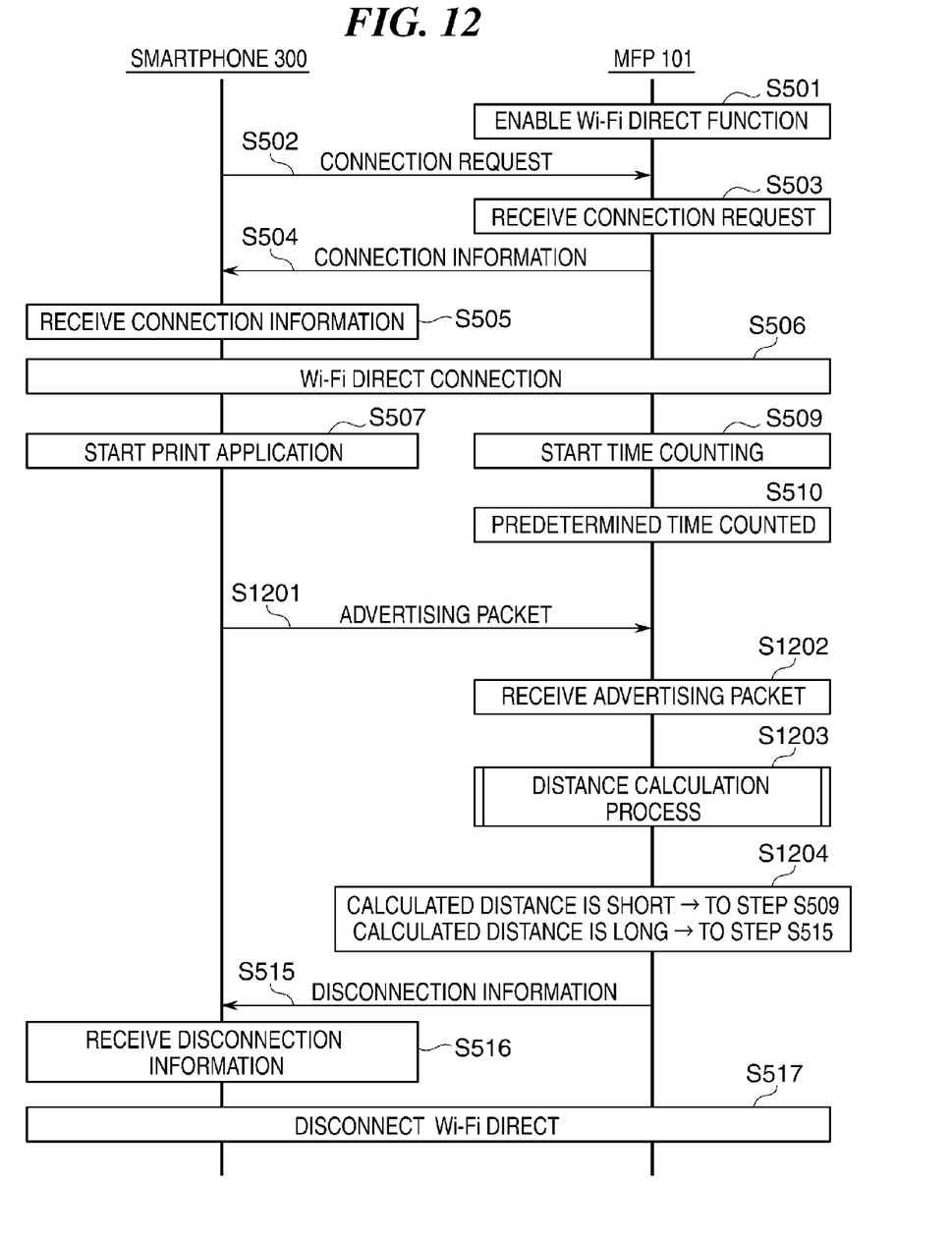
FIG. 12 is a sequence diagram of a Wi-Fi direct connection extension process, performed by an MFP as a printing apparatus according to a second embodiment of the present invention and a smartphone as an external apparatus.

FIG. 12 is a sequence diagram of a Wi-Fi direct connection extension process which is performed by the MFP 101 as a printing apparatus according to the second embodiment and the smartphone 300 as an external apparatus. The steps S501 to S507, S509, S510, and S515 to S517 in FIG. 12 are the same as the steps S501 to S507, S509, S510, and S515 to S517 in FIG. 5, and hence the description will be given of different points from the Wi-Fi direct connection extension process in FIG. 5.

Referring to FIG. 12, the smartphone 300 on which the print application has been started transmits an advertising packet to the MFP 101 (step S1201), and upon receipt of the advertising packet (step S1202), the MFP 101 calculates a distance between the MFP 101 and the smartphone 300 by performing a distance calculation process (FIG. 13), described hereinafter (step S1203). When the calculated distance between the MFP 101 and the smartphone 300 is shorter than a predetermined distance set to the MFP 101 in advance, it is considered that the user holding the smartphone 300 has approached the MFP 101 with an intention to perform print processing and the print application is being operated on the smartphone 300. Therefore, the MFP 101 resets the timer to extend the Wi-Fi direct connection between the MFP 101 and the smartphone 300, and the process returns to the step S509 (described as part of a step S1204). When the calculated distance between the MFP 101 and the smartphone 300 is longer than the predetermined distance, it is considered that the user holding the smartphone 300 has no intention to perform print processing and has moved away from the MFP 101, and the print application is not being operated on the smartphone 300. Therefore, the process proceeds to the step S515 (described as part of the step S1204), and then the Wi-Fi direct connection between the MFP 101 and the smartphone 300 is disconnected (step S517).

Figure 13:
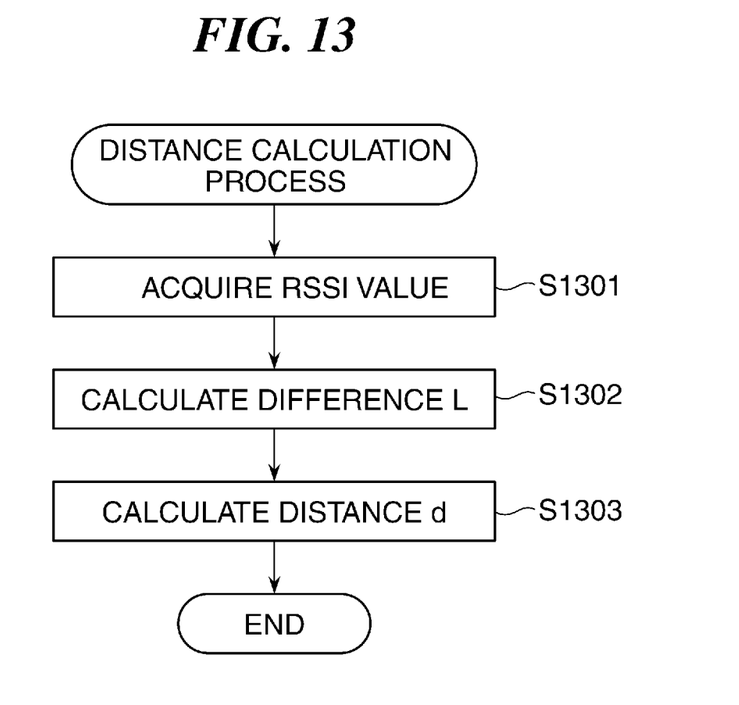
FIG. 13 is a flowchart of a distance calculation process performed in a step in FIG. 12.

FIG. 13 is a flowchart of the distance calculation process performed in the step S1203 in FIG. 12. Note that the advertising packet received by the MFP 101 contains a value of intensity (hereinafter referred to as the "transmitted radio wave intensity") of a radio wave (hereinafter referred to as the "transmitted radio wave") of the advertising packet at the time of transmission of the advertising packet from the smartphone 300 to the MFP 101.

When the MFP 101 has received the advertising packet, the MFP 101 acquires an RSSI value which is a value indicative of intensity of the radio wave of the received advertising packet (hereinafter referred to as the "received radio wave intensity") (step S1301), calculates a difference L between the transmitted radio wave intensity and the received radio wave intensity (step S1302), and calculates a distance d between the MFP 101 and the smartphone 300 based on the following equation (step S1303), followed by terminating the present process.

$$\text{distance } d = \text{wavelength } \lambda \text{ of transmitted}$$
$$\text{radio wave} \times \sqrt{\text{difference } L} \Big/ (4 \times \text{circumference ratio})$$

According to the Wi-Fi direct connection extension process in FIG. 12, the distance between the MFP 101 and the smartphone 300 is calculated (step S1203), and when the calculated distance between the MFP 101 and the smartphone 300 is shorter than the predetermined distance set to the MFP 101 in advance, the Wi-Fi direct connection between the MFP 101 and the smartphone 300 is extended (step S1204), whereas when the calculated distance between the MFP 101 and the smartphone 300 is longer than the predetermined distance, the Wi-Fi direct connection between the MFP 101 and the smartphone 300 is disconnected (steps S1204 and S517). By executing this process, extension or disconnection of the Wi-Fi direct connection is determined according to the intention of the user holding the smartphone 300 as to execution of print processing, which enables the user having the intention to perform print processing to smoothly perform the operation of the print application.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050799 filed Mar. 13, 2015, which is hereby incorporated by reference herein in its entirety.

What is claimed is:

1. A printing apparatus comprising:
a wireless communicator configured to perform wireless connection with an external apparatus by direct wireless communication; and
processing circuitry configured to:
request information from the external apparatus that indicates whether or not a user is operating a print application on the external apparatus, the print application being an application that communicates with the printing apparatus;
acquire the requested information from the external apparatus;
determine, based on the information acquired from the external apparatus, whether or not the user is operating the print application on the external apparatus; and
control the wireless communicator not to disconnect the wireless connection by direct wireless communication in a case where it is determined that the user is operating the print application on the external apparatus and to disconnect the wireless connection by direct wireless communication in a case where it is determined that the user is not operating the print application on the external apparatus.

2. The printing apparatus according to claim 1, wherein the processing circuitry is further configured to count a time period, and the information is acquired from the external apparatus when the counted time period has reached a predetermined time period.

3. A method of controlling a printing apparatus including a wireless communicator configured to perform wireless connection with an external apparatus by direct wireless communication, comprising:
performing wireless connection to the external apparatus by direct wireless communication;
requesting information from the external apparatus that indicates whether or not a user is operating a print application on the external apparatus, the print application being an application that communicates with the printing apparatus;
acquiring the requested information from the external apparatus;
determining, based on the information acquired from the external apparatus, whether or not the user is operating the print application on the external apparatus; and
controlling the wireless communicator not to disconnect the wireless connection by direct wireless communication in a case where it is determined that the user is operating the print application on the external apparatus and to disconnect the wireless connection by direct wireless communication in a case where it is determined that the user is not operating the print application on the external apparatus.

4. A non-transitory computer-readable storage medium storing a computer-executable program for executing a method of controlling a printing apparatus including a wireless communicator configured to perform wireless connection with an external apparatus by direct wireless communication,
wherein the method comprises:
performing wireless connection to the external apparatus by direct wireless communication;
requesting information from the external apparatus that indicates whether or not a user is operating a print application on the external apparatus, the print application being an application that communicates with the printing apparatus;
acquiring the requested information from the external apparatus;
determining, based on the information acquired from the external apparatus, whether or not the user is operating the print application on the external apparatus; and
controlling the wireless communicator not to disconnect the wireless connection by direct wireless communication in a case where it is determined that the user is operating the print application on the external apparatus and to disconnect the wireless connection by direct wireless communication in a case where it is determined that the user is not operating the print application on the external apparatus.

* * * * *